(12) United States Patent  
Chih

(10) Patent No.: US 6,742,270 B2  
(45) Date of Patent: Jun. 1, 2004

(54) LUMINESCENT INDICATION COMPASS

(76) Inventor: Kao-Hsing Chih, No. 448-2, Meiting St., Bei Chiu, Taichung (TW)

( * ) Notice: Subject to any disclaimer, the term of this patent is extended or adjusted under 35 U.S.C. 154(b) by 0 days.

(21) Appl. No.: 10/243,724

(22) Filed: Sep. 16, 2002

(65) Prior Publication Data

US 2004/0049932 A1 Mar. 18, 2004

(51) Int. Cl.$^7$ .............................. G01C 17/26
(52) U.S. Cl. ....................... 33/363 R; 33/355 R
(58) Field of Search ................. 33/355 R, 363 R, 33/363 K, 363 L, 363 N, 363 Q, 363 Y; 362/800

(56) References Cited

U.S. PATENT DOCUMENTS

| | | | | |
|---|---|---|---|---|
| 4,796,365 A | * | 1/1989 | Hudson | 33/356 |
| 5,079,845 A | * | 1/1992 | Childers | 33/363 K |
| 5,191,792 A | * | 3/1993 | Gloor | 33/355 R |
| 5,253,424 A | * | 10/1993 | Kendall | 33/355 R |
| 5,435,070 A | * | 7/1995 | Kilian | 33/355 R |
| 5,511,319 A | * | 4/1996 | Geerlings et al. | 33/355 R |
| 5,761,094 A | * | 6/1998 | Olson et al. | 33/355 R |
| 6,023,229 A | * | 2/2000 | Bugno et al. | 33/355 R |
| 6,047,237 A | * | 4/2000 | Michmerhuizen | 33/355 R |
| 6,292,137 B1 | * | 9/2001 | Agnew et al. | 33/355 R |
| 2002/0066194 A1 | * | 6/2002 | Lu | 33/355 R |

* cited by examiner

Primary Examiner—G. Bradley Bennett  
(74) Attorney, Agent, or Firm—Rosenberg, Klein & Lee

(57) ABSTRACT

A luminescent indication compass includes an electric power supply, a luminescent driver, a luminescent panel, a control panel, a voltage dropping circuit, and an electronic compass module. The electronic compass module may detect the signals of orientation and process the detected signals. Then, the processed signals may be output from the luminescent driver and may then be transmitted to the luminescent panel for indicating the present orientation to the user. Thus, when the luminescent indication compass of the present invention is mounted on the car, the driver may understand the present orientation of the car.

1 Claim, 6 Drawing Sheets

LUMINESCENT INDICATION COMPASS

BACKGROUND OF THE INVENTION

1. Field of the Invention

The present invention relates to a luminescent indication compass, and more particularly to a luminescent indication compass that may be mounted on the car, so that the driver may understand the present orientation of the car.

2. Description of the Related Art

A conventional compass may be used to indicate the present orientation, so that the user may know the present orientation and location by the compass. However, the conventional compass cannot be mounted on the car, so that the driver cannot look at the compass easily when driving the car, thereby causing inconvenience to the driver.

SUMMARY OF THE INVENTION

The present invention has arisen to mitigate and/or obviate the disadvantage of the conventional compass.

The primary objective of the present invention is to provide a luminescent indication compass that may be mounted on the car, so that the driver may understand the present orientation of the car.

Another objective of the present invention is to provide a luminescent indication compass that may indicate the present orientation in a luminescent manner, thereby facilitating the user using the compass.

In accordance with the present invention, there is provided a luminescent indication compass, comprising an electric power supply, a luminescent driver, a luminescent panel, a control panel, a voltage dropping circuit, and an electronic compass module, wherein:

the luminescent driver is connected to the electric power supply for transmitting processed signals of orientation to the luminescent panel;

the luminescent panel is connected to the luminescent driver, for indicating the processed signals of orientation;

the control panel is connected to the electric power supply to control operation of the voltage dropping circuit;

the voltage dropping circuit is connected to the control panel for dropping a voltage supplied from the electric power supply through the control panel; and the electronic compass module is connected to the luminescent driver and the voltage dropping circuit, and is driven by a dropped voltage supplied from the voltage dropping circuit to process signals of orientation, and the processed signals of orientation are transmitted through the luminescent driver to the luminescent panel.

Further benefits and advantages of the present invention will become apparent after a careful reading of the detailed description with appropriate reference to the accompanying drawings.

DETAILED DESCRIPTION OF THE INVENTION

Figure 1:
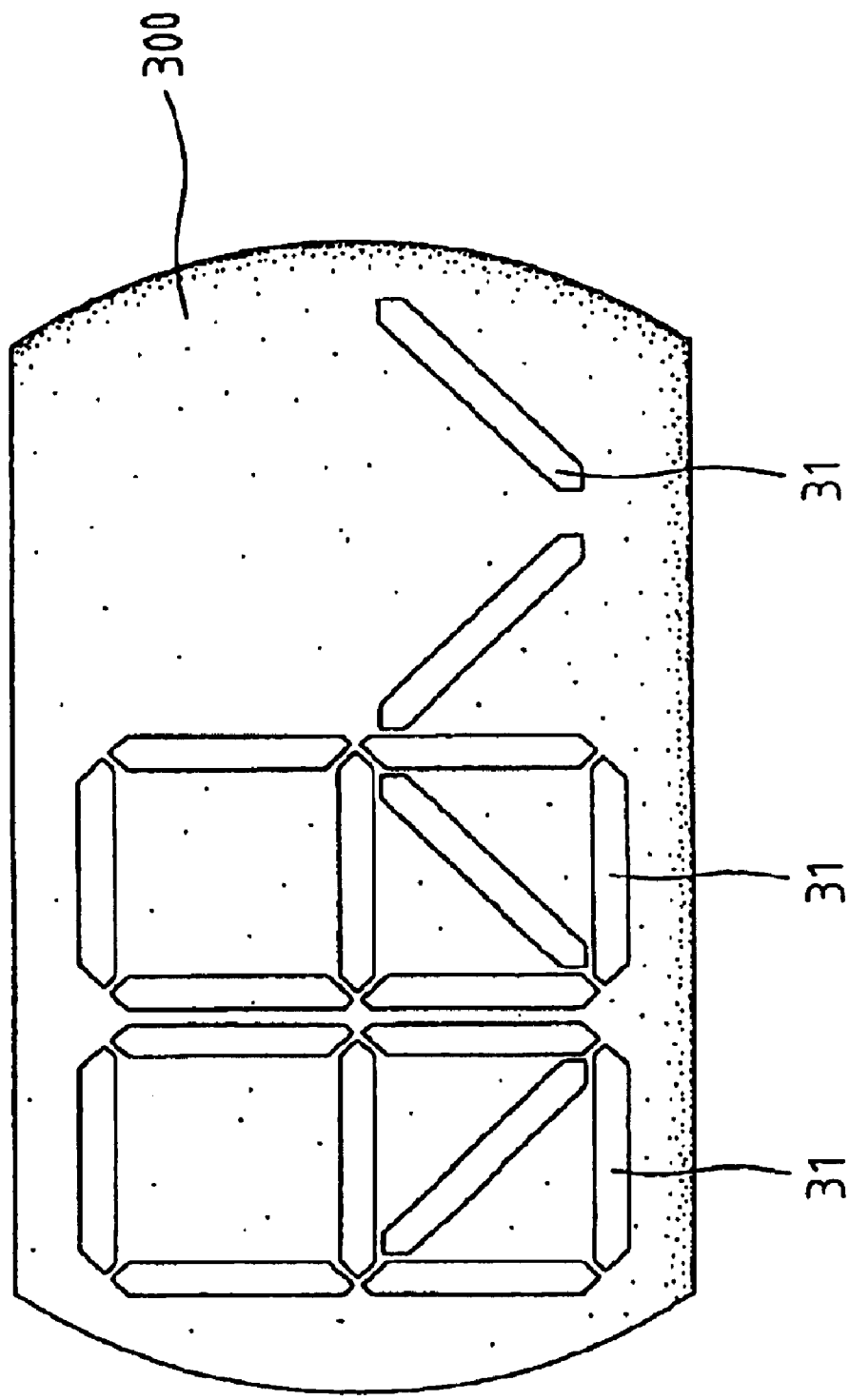
FIG. 1 is a schematic view of a luminescent panel of a luminescent indication compass in accordance with a preferred embodiment of the present invention.
Figure 2:
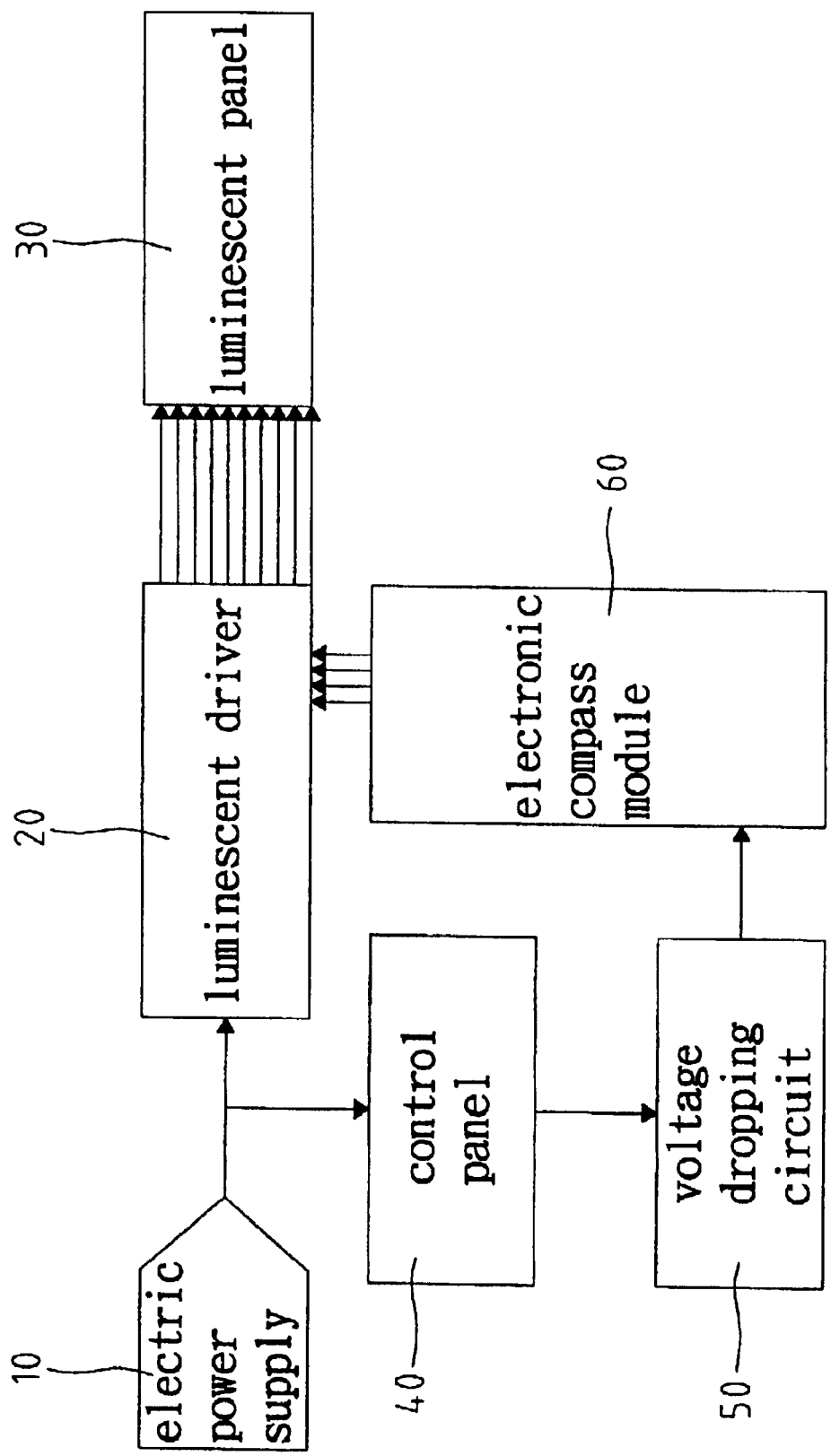
FIG. 2 is a block diagram of the luminescent indication compass in accordance with the preferred embodiment of the present invention.

Referring to the drawings and initially to FIGS. 1 and 2, a luminescent indication compass 300 in accordance with a preferred embodiment of the present invention comprises an electric power supply 10, a luminescent driver 20, a luminescent panel 30, a control panel 40, a voltage dropping circuit 50, and an electronic compass module 60.

The electric power supply 10 is a voltage input of 12 volts, so as to provide an electric power to each circuit.

The luminescent driver 20 is connected to the electric power supply 10, and may be operated after the electric power supply 10 supplies the electric power to the luminescent driver 20. The luminescent driver 20 has an input terminal for inputting signals into the luminescent driver 20 to be processed. The processed signals may be output from an output terminal of the luminescent driver 20 and may be transmitted to the luminescent panel 30.

Figure 6:
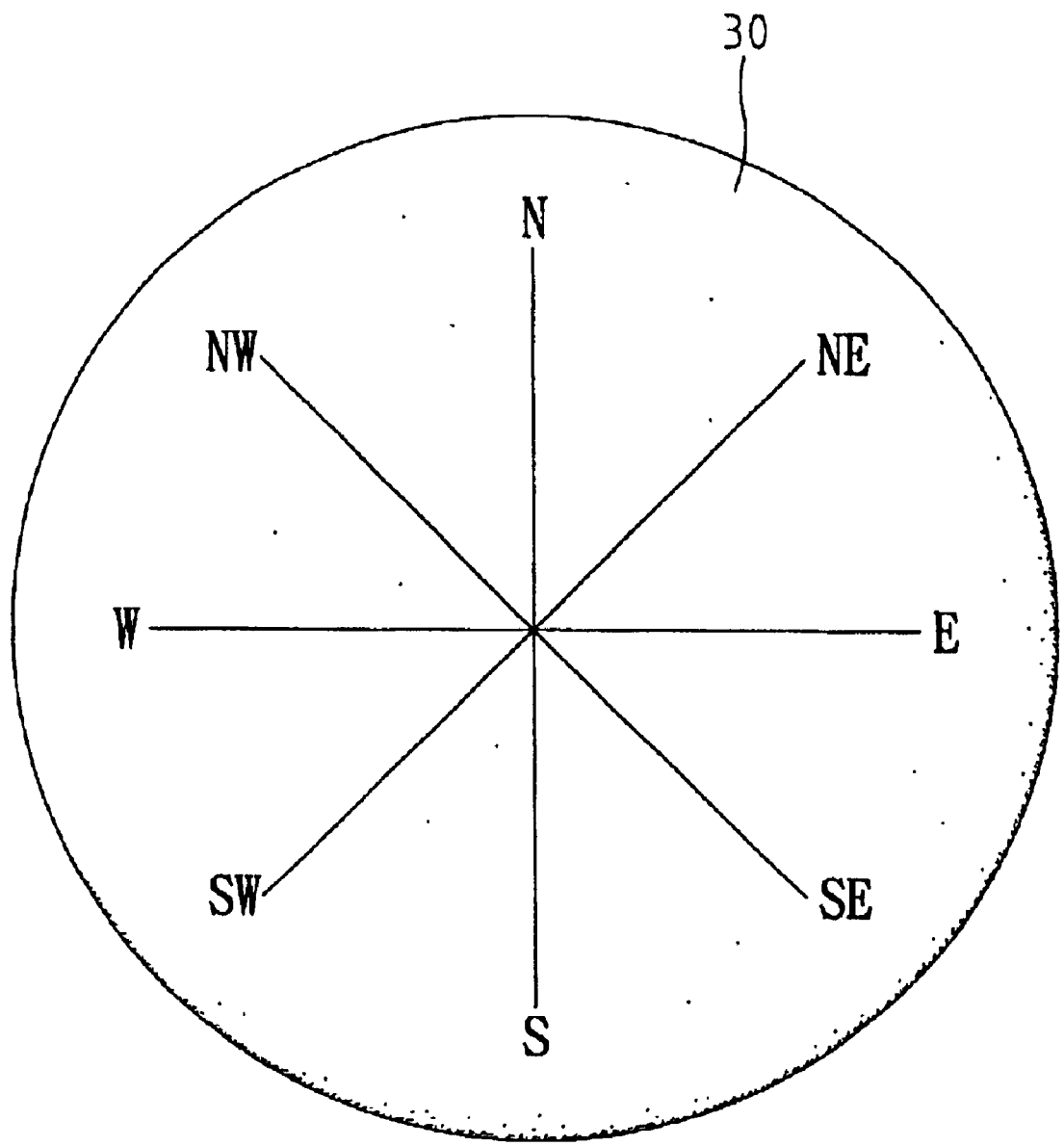
FIG. 6 is a schematic view of the luminescent panel of a luminescent indication compass in accordance with another embodiment of the present invention.

The luminescent panel 30 is connected to the luminescent driver 20, and includes a plurality of multi-stage indicators 31 (see FIG. 1) juxtaposed with each other. Thus, the luminescent panel 30 may indicate the present angle by the numbers. After the processed signals output from the output terminal of the luminescent driver 20 is input into the luminescent panel 30, the numbers on the multi-stage indicators 31 of the luminescent panel 30 may be changed. As shown in FIG. 6, the luminescent panel 30 may present English letters to indicate the orientation.

The control panel 40 is connected to the electric power supply 10 to control operation of the voltage dropping circuit 50.

The voltage dropping circuit 50 is connected to the control panel 40. When the switch of the control panel 40 is turned on, the voltage of the electric power supply 10 may be input into the voltage dropping circuit 50 through the control panel 40, and may be dropped by the voltage dropping circuit 50. Then, the dropped voltage may be output from the voltage dropping circuit 50.

The electronic compass module 60 is connected to the luminescent driver 20 and the voltage dropping circuit 50. After the dropped voltage output from the voltage dropping circuit 50 is supplied into the electronic compass module 60, the electronic compass module 60 is started and driven by the voltage. Thus, the electronic compass module 60 may process the detected signals, and the processed signals may be output from the output terminal of the luminescent driver 20 and may be transmitted to the luminescent panel 30 for indication.

Referring to FIGS. 2 and 6, when the switch of the control panel 40 is turned on, the voltage of the electric power supply 10 may be input into the voltage dropping circuit 50 through the control panel 40, and may be dropped by the voltage dropping circuit 50. Then, the dropped voltage may be output from the voltage dropping circuit 50 into the electronic compass module 60 to start the electronic compass module 60. When the electronic compass module 60 detects that the present orientation is located at the eastern southern direction, the electronic compass module 60 may process the detected signals, and the processed signals may be output from the output terminal of the luminescent driver 20 and may be transmitted to the luminescent panel 30 for indicating "SE", thereby provide the present orientation to the user.

Figure 3:
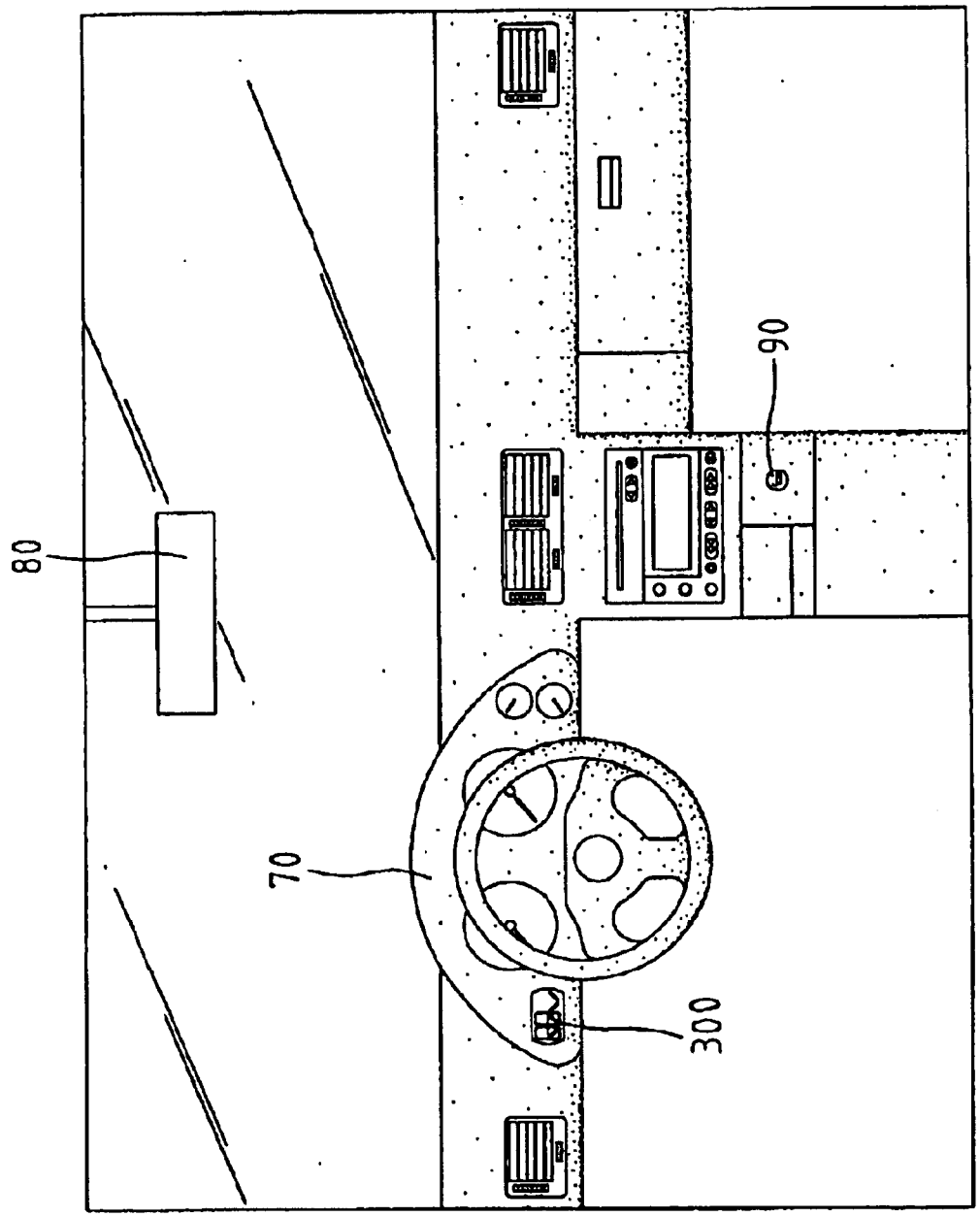
FIG. 3 is a schematic view of the usage state of the luminescent indication compass in accordance with an embodiment of the present invention.

Referring to FIG. 3, the luminescent indication compass 300 of the present invention is mounted on the instrument panel 70 of the car. Thus, when the electronic compass module 60 detects the signals of orientation, the electronic compass module 60 may process the detected signals, and the processed signals may be output from the luminescent driver 20 and may be transmitted to the luminescent panel 30 for indicating the present orientation to the user.

Figure 4:
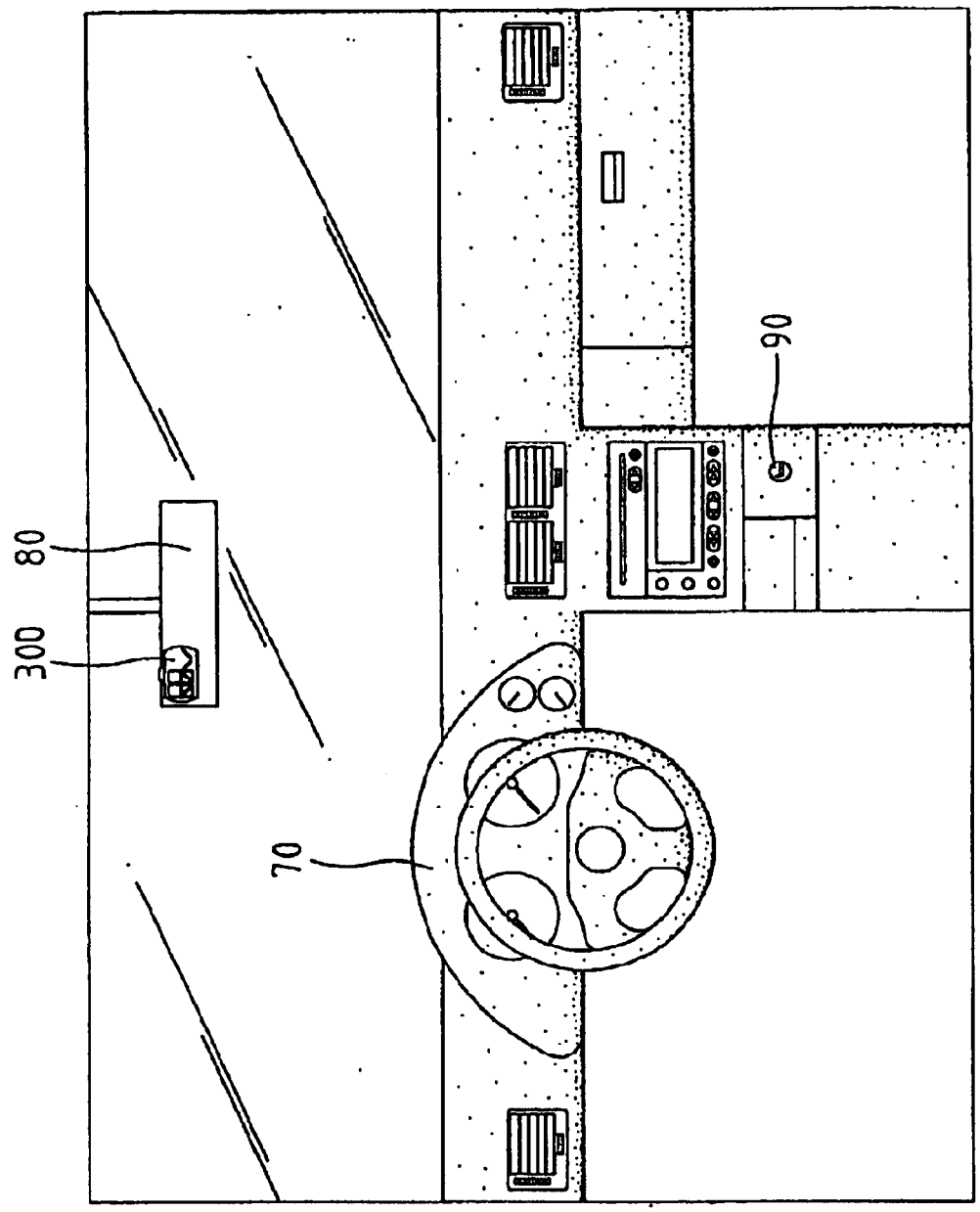
FIG. 4 is a schematic view of the usage state of the luminescent indication compass in accordance with another embodiment of the present invention.

Referring to FIG. 4, the luminescent indication compass 300 of the present invention is mounted on the rearview mirror 80 of the car. Thus, when the electronic compass module 60 detects the signals of orientation, the electronic compass module 60 may process the detected signals, and the processed signals may be output from the luminescent driver 20 and may be transmitted to the luminescent panel 30 for indicating the present orientation to the user.

Figure 5:
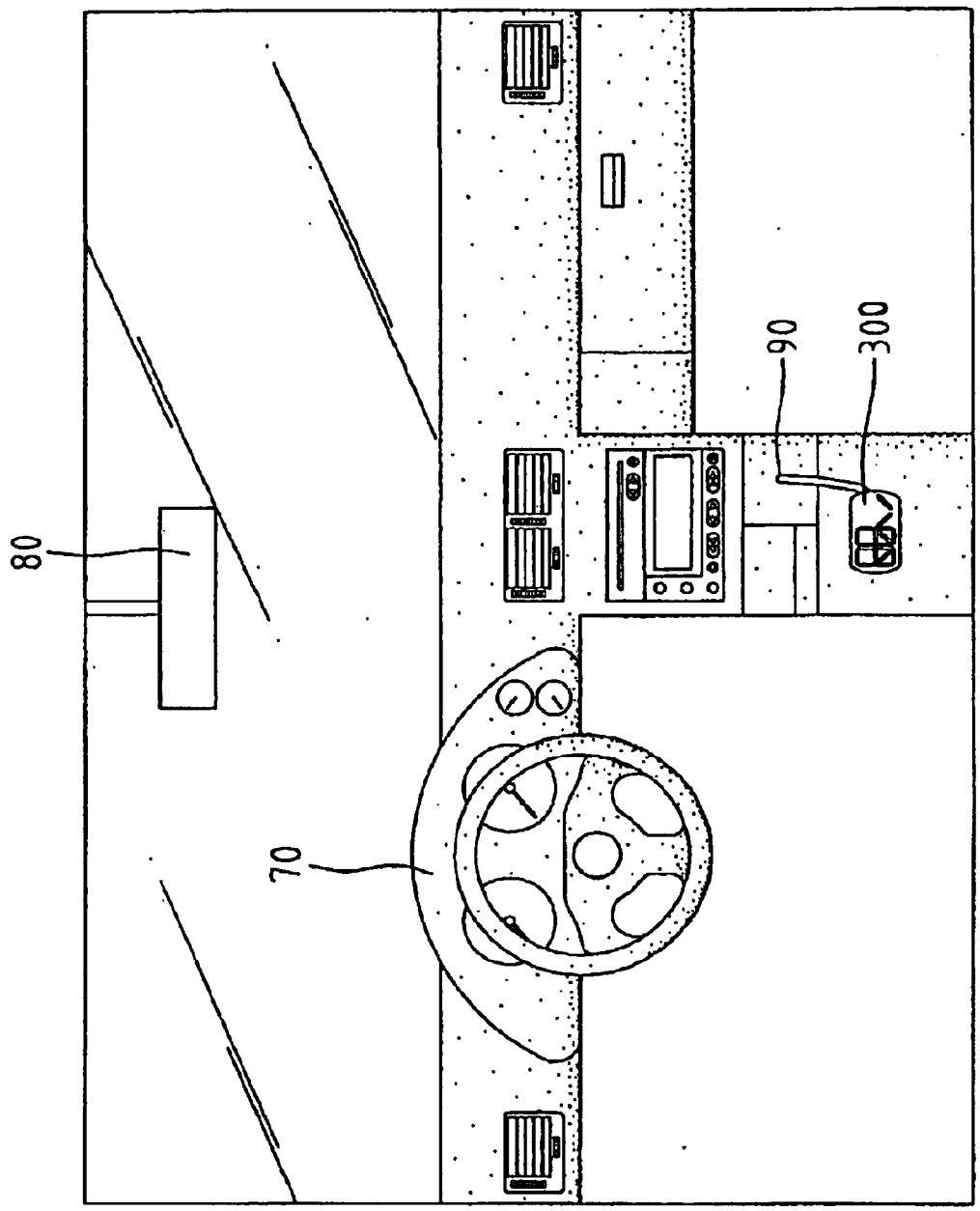
FIG. 5 is a schematic view of the usage state of the luminescent indication compass in accordance with another embodiment of the present invention.

Referring to FIG. 5, the luminescent indication compass 300 of the present invention is mounted in the car and located adjacent to the cigarette igniter 90 of the car. In addition, the electric power of the luminescent indication compass of the present invention is supplied by the cigarette igniter 90 of the car. Thus, when the electronic compass module 60 detects the signals of orientation, the electronic compass module 60 may process the detected signals, and the processed signals may be output from the luminescent driver 20 and may be transmitted to the luminescent panel 30 for indicating the present orientation to the user.

According to the luminescent indication compass 300 of the present invention, the electronic compass module 60 may detect the signals of orientation and process the detected signals, and the processed signals may then be output from the luminescent driver 20 and may then be transmitted to the luminescent panel 30 for indicating the present orientation to the user. Thus, when the luminescent indication compass 300 of the present invention is mounted on the car, the driver may understand the present orientation of the car.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A luminescent indication compass, comprising an electric power supply, a luminescent driver, a luminescent panel, a control panel, a voltage dropping circuit, and an electronic compass module, wherein:

the luminescent driver is connected to the electric power supply for transmitting processed signals of orientation to the luminescent panel;

the luminescent panel is connected to the luminescent driver, for indicating the processed signals of orientation;

the control panel is connected to the electric power supply to control operation of the voltage dropping circuit, the luminescent panel includes a plurality of multi-stage indicators juxtaposed with each other, the multi-stage indicators are arranged as four parallel upright columns and each columns includes two indicators, three separated horizontal indicators are connected between a first column and a second column of the indicators, the other three separated horizontal indicators are connected between a third column and a fourth column of the indicators, four inclined indicators are arranged as two substantially "V" arrangements, one of the two indicators of one of the two "V" arrangements is located between the first column and the second column of the indicators, the other of the two indicators of said one of the two "V" arrangements is respectively located between the third column and the fourth column of the indicators, the other "V" arrangement is located beside the fourth column of indicators;

the voltage dropping circuit is connected to the control panel for dropping a voltage supplied from the electric power supply through the control panel; and the electronic compass module is connected to the luminescent driver and the voltage dropping circuit, and is driven by a dropped voltage supplied from the voltage dropping circuit to process signals of orientation, and the processed signals of orientation are transmitted through the luminescent driver to the luminescent panel.

\* \* \* \* \*